(12) United States Patent
Ying

(10) Patent No.: US 7,099,163 B1
(45) Date of Patent: Aug. 29, 2006

(54) PWM CONTROLLER WITH CONSTANT OUTPUT POWER LIMIT FOR A POWER SUPPLY

(75) Inventor: Zheng Ying, Shanghai (CN)

(73) Assignee: BCD Semiconductor Manufacturing Limited, Grand Cayman (KY)

( * ) Notice: Subject to any disclaimer, the term of this patent is extended or adjusted under 35 U.S.C. 154(b) by 0 days.

(21) Appl. No.: 11/271,901

(22) Filed: Nov. 14, 2005

(51) Int. Cl.
*H02M 3/335* (2006.01)

(52) U.S. Cl. ...................... 363/21.11; 363/49
(58) Field of Classification Search ............ 363/20, 363/21.01, 21.1, 21.11, 21.18, 41, 49
See application file for complete search history.

(56) References Cited

U.S. PATENT DOCUMENTS

| | | | |
|---|---|---|---|
| 5,828,558 A * | 10/1998 | Korcharz et al. ............ | 363/20 |
| 6,577,509 B1 * | 6/2003 | Deboy et al. ................ | 363/20 |
| 6,661,679 B1 * | 12/2003 | Yang et al. .................. | 363/41 |
| 6,768,655 B1 * | 7/2004 | Yang et al. ............... | 363/21.01 |
| 6,839,247 B1 * | 1/2005 | Yang et al. ............... | 363/21.11 |
| 6,865,093 B1 * | 3/2005 | Disney ....................... | 363/21.1 |
| 6,903,945 B1 * | 6/2005 | Kitano ..................... | 363/21.01 |
| 6,906,934 B1 * | 6/2005 | Yang et al. .................. | 363/49 |
| 6,972,969 B1 * | 12/2005 | Shteynberg et al. ...... | 363/21.12 |

* cited by examiner

*Primary Examiner*—Adolf Berhane
(74) *Attorney, Agent, or Firm*—Birch, Stewart, Kolasch & Birch, LLP

(57) ABSTRACT

A PWM controller has a line voltage input that allows using a start-up resistor for both start-up and power-limit compensations so that it can save the power consumption, ease the PCB layout, and shrink the power supply size. In the integrated circuit, a current switch used for both start-up and line voltage sensing is composed of a diode and a switch transistor. A current multiplier is used to improve the precise by canceling the impact of the integrated resistor's absolute value, which is composed of a transistor loop, a constant current and a reference current. Thus, by properly selecting the value of the start-up resistor, an identical output power limit for low line and high line voltage input can be achieved.

2 Claims, 5 Drawing Sheets

PWM CONTROLLER WITH CONSTANT OUTPUT POWER LIMIT FOR A POWER SUPPLY

FIELD OF THE INVENTION

The present invention relates to a power supply. More particularly, the present invention relates to the pulse width modulation (PWM) of a switching mode power converter.

BACKGROUND OF THE INVENTION

The PWM is a traditional technology used in the switching mode power converter to control the output power and achieve the regulation. Most of the equipments, such as mobile phone, TV game, computer and so on are using PWM power converters to supply power and charge battery. Various protection functions such as over-voltage and over-current protection are built in the power supply to protect the power supply and the load from permanent damage. The function of output power limit is generally used for the over-load and short circuit protection.

Referring to FIG. 1, it shows a conventional application circuit of the PWM power supply. A PWM controller 10 controls the power output and achieves the regulation. The operation of PWM-control starts on the charging of a start-up capacitor 18 via a serial start-up resistor 12 when the power is turned on until the supply voltage VCC reaches the threshold voltage, and then the PWM controller 10 starts to output a PWM signal and drive the entire power supply. After the start-up, the supply voltage VCC is provided from the auxiliary bias winding of the transformer 20 through a rectifier 19. A resistor 11 that is connected serially with the power metal-oxide semiconductor field-effect transistor (MOSFET) 17 determines the maximum output power of the power supply. The method is to connect the voltage (VS) of resistor 11 to the current-sense input of the PWM controller 10. If the voltage VS is greater than the maximum current-sense voltage such as 1V, the PWM controller 10 will disable the output of its OUT pin and restrict the maximum power output of the power supply. The energy stored in an inductor is given by $$E = \frac{1}{2} \times L_p \times I_p^2 = P \times T \quad (1)$$

Where Ip and Lp are the peak current and the primary inductance of the transformer 20 respectively, and T is the PWM switching period. The peak current Ip can be expressed as follows:

$$I_p = \frac{Vin}{L_p} \times t_{ON} \quad (2)$$

Where $t_{ON}$ is the turn-on time of the PWM signal in which the power MOSFET 17 is switched on, and $V_{in}$ is the input line voltage. Thus the output power (P) of a PWM power supply can be calculated as follows:

$$P = \frac{Vin^2 \times t_{ON}^2}{2 \times T \times L_p} \times \eta \quad (3)$$

Where η is the energy transfer ratio from primary to secondary. Assuming the load is constant, as Vin varies from low to high, the output voltage (Vout) will be kept constant by automatically adjusting the $t_{ON}$ through the feedback control loop of the power supply, and $t_{ON}$ can be calculated from the equation (4) and the equation (5).

$$Vin = \frac{N \times (1-D)}{D} \times Vout \quad (4)$$

$$D = \frac{t_{ON}}{T} \quad (5)$$

Where N is the turn-on ratio, but the maximum $t_{ON}$ is restricted and can be expressed as the equation (6) when the voltage in the VS pin is higher than a power limit voltage $V_{limit}$, such as 1V in the PWM-control IC UC384X.

$$t_{ON} = \frac{V_{limit} \times L_p}{Vin \times Rs} \quad (6)$$

Rs is the resistance of a current sense resistor 11 which is added between the source of the power MOSFET 17 and the ground for current sensing. Furthermore, the maximum output power ($P_{max}$) is also affected by the PWM controller's 10 response time $t_D$. From the moment that the voltage in the VS pin is higher than the power limit voltage to the moment that the PWM controller's 10 OUT pin is actually off, there is a delay time $t_D$. Within this delay time $t_D$, the power MOSFET 17 is still on, and it will continue delivering power. Therefore, the actual turn-on time of the PWM signal is equal to $t_{ON}+t_D$, and the actual maximum output power ($P_{max}$) becomes as follows:

$$P_{max} = \frac{V_{in}^2 \times (t_{ON} + t_D)^2}{2 \times L_p \times T} \quad (7)$$

Although the $t_D$ time is short, generally within the range of 150~200 ns, the higher the operating frequency is, the more impact is caused by $t_D$ because the switching period T is short and $t_D$ becomes relatively more important. Normally, $t_D$ is a constant time determined by the controller's speed. Thus, the maximum output power $P_{max}$ from the equation (7) will vary as the input line voltage $V_{in}$ varies. When the safety regulations are taken into consideration, the range of the input line voltage Vin is from 90Vac to 264Vac, wherein the output power limit ($P_{Hight}$) of the power supply in high line voltage (Hight) is many times higher than the output power limit ($P_{Low}$) in low line voltage (Low). If power limit voltage $V_{limit}$ is constant, the max output power $P_{max}$ will vary with the line voltage, as shown in FIG. 2. That's why line compensation is needed. And, a high voltage across the resistor 13 causes inconvenience for the component selection and printed circuit board (PCB) layout.

SUMMARY OF THE INVENTION

The present invention provides a PWM controller having a line voltage input that allows using one resistor for chip start-up and line voltage sensing so that it can save the power consumption, ease the PCB layout, and shrink the power supply size. The PWM controller comprises a current switch, a current multiplier, a reference current and a current adder to start up the power supply and compensate the output power limit.

A start-up resistor is connected from the input voltage to the current switch unit to provide an input current for the PWM controller, wherein the variation of the input current is directly proportional to the change of the input voltage Vin. The current switch includes a diode and a switch transistor. During the start-up, the switch transistor is closed by an under-voltage lockout (UVLO). The start-up diode transparently drives the input current to charge up a start-up capacitor. When the supply voltage VCC reaches the UVLO's threshold voltage, the PWM controller starts to operate, the switch transistor is turn-on by the UVLO and the start-up diode is reverse biased. The input current flows into the current multiplier to generate an offset current. The current adder subtracts the offset current from the reference current. Through a resistor, a power limit voltage is produced. Because the offset current is a function of the input line voltage, the variation of the power limit voltage is inversely proportional to the deviation of the input voltage. Besides, by selecting a proper start-up resistor, an identical output power limit can be achieved for low line and high line voltage input.

A resistor is needed to transform the current to the voltage, however it is difficult to design a precise resistor inside the integrated circuit. A current multiplier is used to cancel out the impact of the resistor's absolute value.

DETAILED DESCRIPTION OF THE PREFERRED EMBODIMENTS

The detailed descriptions for content and technology of the present invention associated with figures are as follows.

Figure 1:
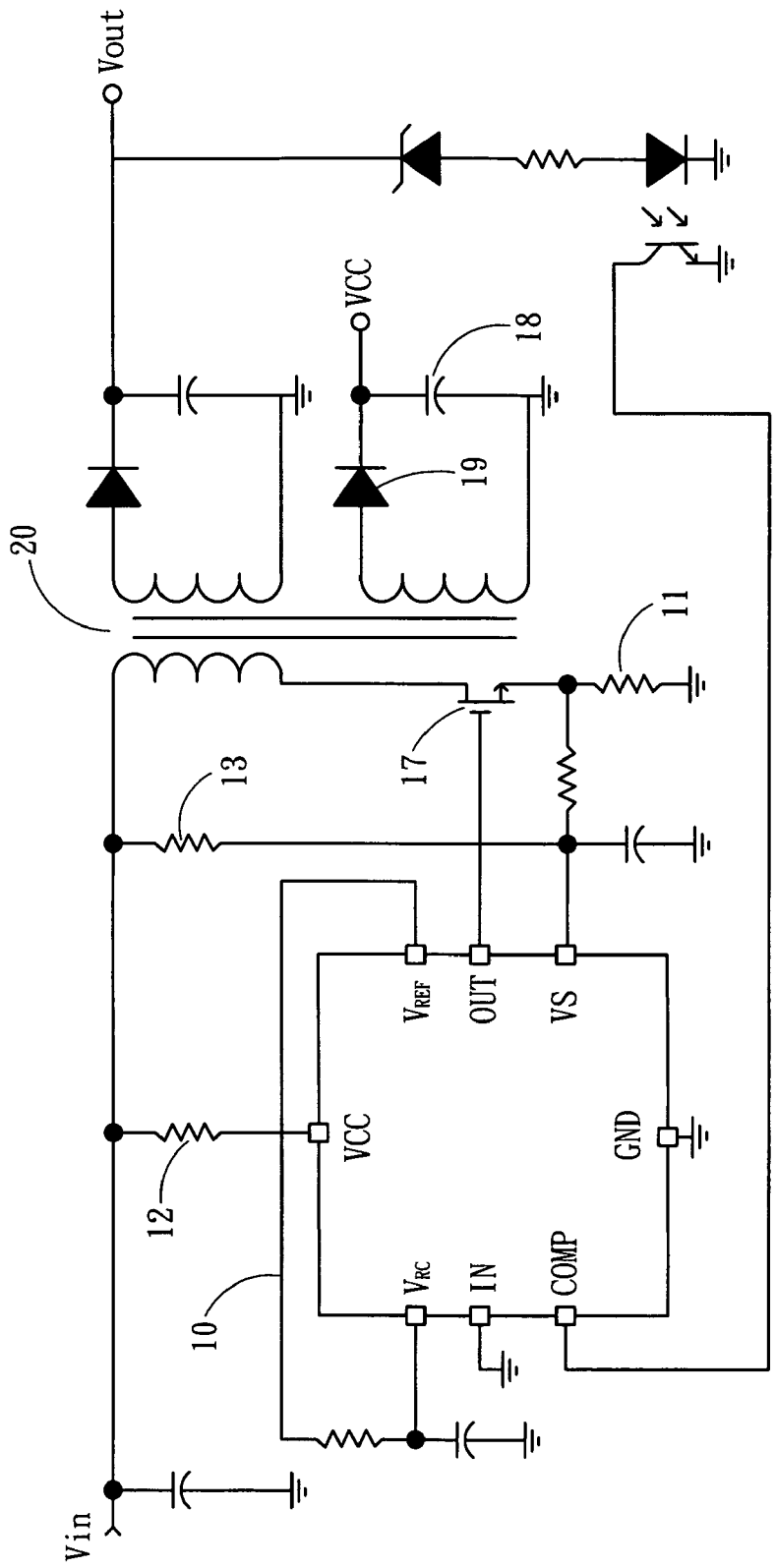
FIG. 1 is a conventional application circuit of the PWM power supply.
Figure 2:
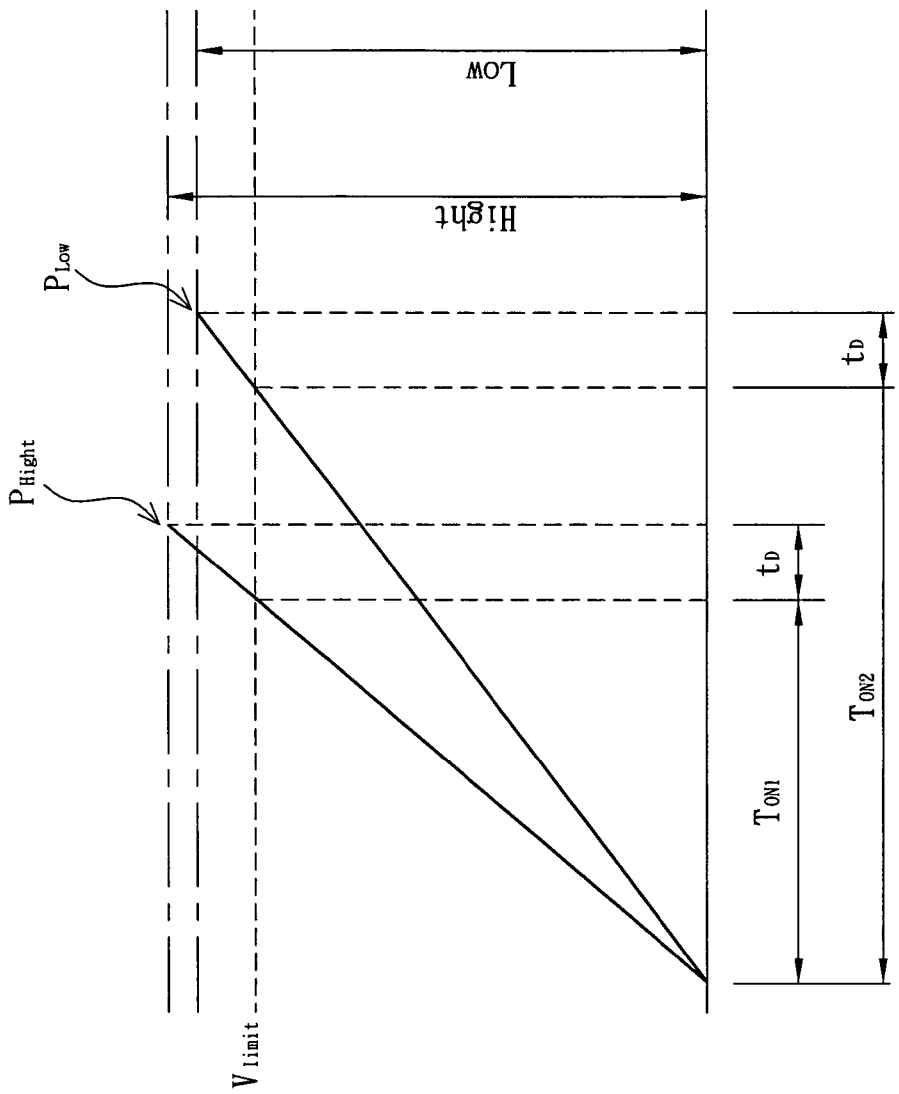
FIG. 2 shows the time diagram of the conventional application circuit if $V_{limit}$ is constant, the max output power $P_{max}$ will vary with line voltage.
Figure 3:
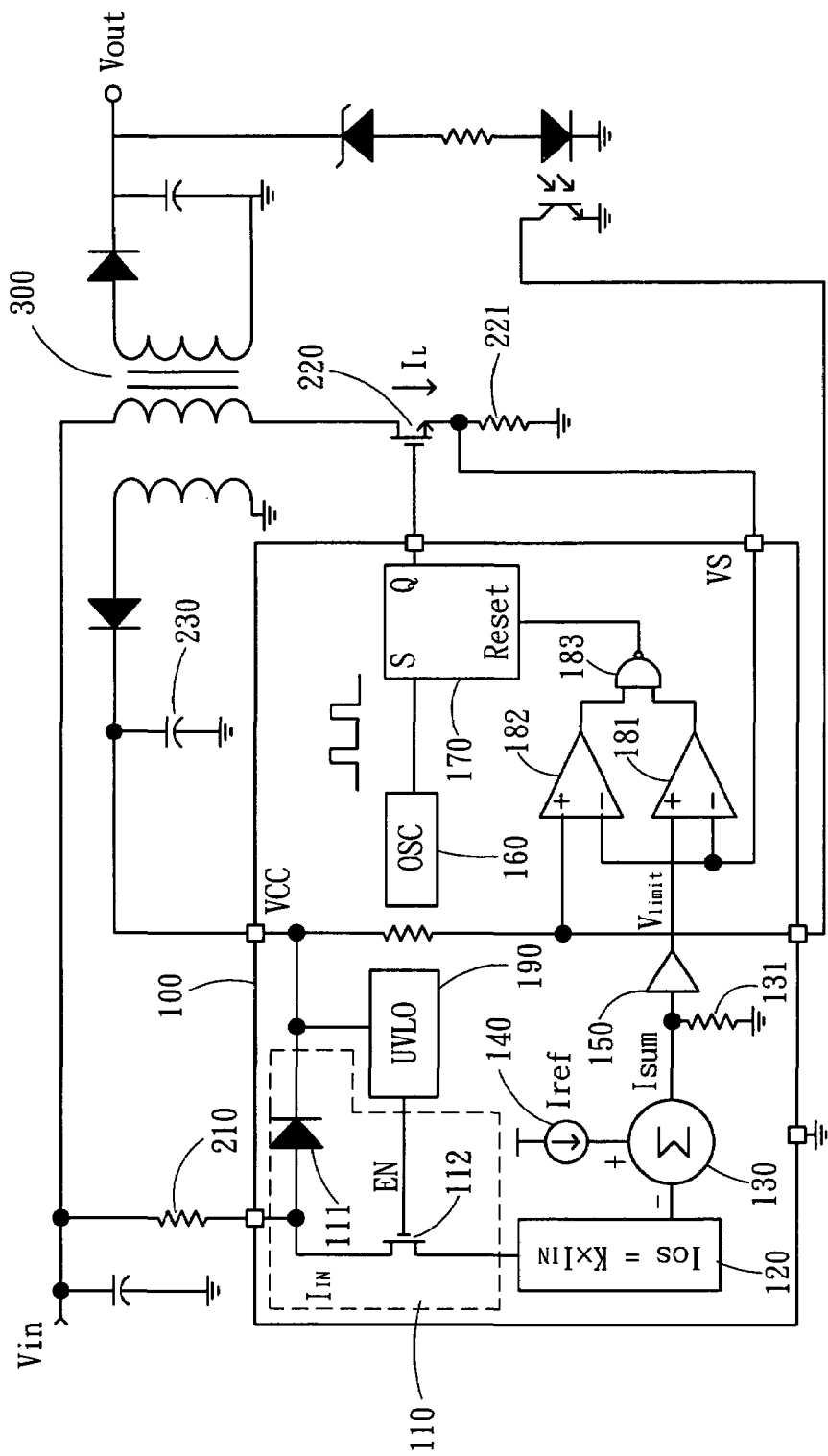
FIG. 3 is the block diagram of the PWM controller of a preferred embodiment of the present invention and connected circuits therewith.

Please refer to FIG. 3. It is the block diagram of the PWM controller of a preferred embodiment of the present invention and connected circuits therewith. The PWM controller 100 comprises a current switch unit 110 composed of a diode 111, a switch transistor 112, a current multiplier 120, a current adder 130, a reference current 140, a buffer 150, an oscillator 160, a flip-flop 170, a first comparator 181, a second comparator 182, a NAND gate 183 and an under-voltage lockout unit 190.

The drain of the switch transistor 112 and the anode of the diode 111 are connected to form an input of the current switch unit 110. A start-up resistor 210 is connected between the input voltage Vin and the input of the current switch unit 110. The cathode of the diode 111 is connected to the power supply voltage VCC. The gate of the switch transistor 112 is controlled by the under-voltage lockout unit 190. The source of the switch transistor 112 is connected to the input terminal of the current multiplier 120. The output of the current multiplier 120 is connected to the negative input terminal of the current adder 130. The reference current 140 is connected to the positive input terminal of the current adder 130. The output current of the current adder 130 is transformed to a voltage signal by a resistor 131. Isolated by the buffer 150, the power limit voltage $V_{limit}$ is connected to the positive input terminal of the first comparator 181. The negative input terminal of the first comparator 181 and the second comparator 182 are connected to the source of a power MOSFET 220. The current $I_L$ flowing through a resistor 221 produces a sense voltage VS in the resistor 221.

Once the power supply is turned on, the input current flows into the current switch unit 110 through the start-up resistor 210. Because the switch transistor 112 is closed by the under-voltage lockout unit 190, all input current flows through the diode 111 and starts to charge up the start-up capacitor 230. When the voltage in the start-up capacitor 230 reaches the threshold voltage of the under-voltage lockout unit 190, the PWM controller 100 starts to operate. The switch transistor 112 is opened by the under-voltage lockout unit 190, the diode 111 is reverse biased, and then all input current $I_{IN}$ flows into the current multiplier 120. After that, the supply voltage VCC will be provided from the auxiliary winding of a transformer 300. The input current $I_{IN}$ will vary proportionately to the input line voltage Vin.

$$I_{IN} = \frac{Vin - V_{gs} - V_{ds}}{R_{startup}} \approx \frac{Vin}{R_{startup}} \quad (8)$$

In equation (8), $R_{startup}$ is the resistance of the start-up resistor 210; $V_{gs}$ is the gate-to-source voltage of the transistor 121; and $V_{ds}$ is the drain-to-source voltage of the switch transistor 112. The input current $I_{IN}$ is transferred to the offset current Ios by the current multiplier 120. Ios can be estimated as $$Ios = K \times I_{IN} \quad (9)$$

K is a constant decided by the design. The current adder 130 subtract the Ios from the Iref (reference current), the result Isum can be expressed as $$Isum = Iref - Ios = Iref - K \times I_{IN} \quad (10)$$

The $V_{limit}$ equals the voltage across the resistor 131 and is isolated by the buffer 150 which determines the maximum output power.

$$V_{limit} = R_{131} \times Isum = R_{131} \times Iref - K \times R_{131} \times \frac{Vin}{R_{startup}} \quad (11)$$

Where $V_{limit}$ is the maximum current-sense voltage that VS can be achieved. $R_{131}$ is the resistance of resistor 131. The resistor 221, which is connected to the source of the power MOSFET 220, plays the role of I-to-V transformation. As the current $I_L$ increases, which flows through the power MOSFET 220, the voltage VS in the resistor 221 will also rise up.

The first comparator 181 will compare the voltage VS and the voltage $V_{limit}$. When the VS is greater then $V_{limit}$, the first comparator 181 will output a logic low signal to the input of a NAND gate 183. Thus, the NAND gate 183 will output a logic high signal to reset a flip-flop 170 to turn off the power MOSFET 220. Therefore, the output power limit is achieved.

Figure 5:
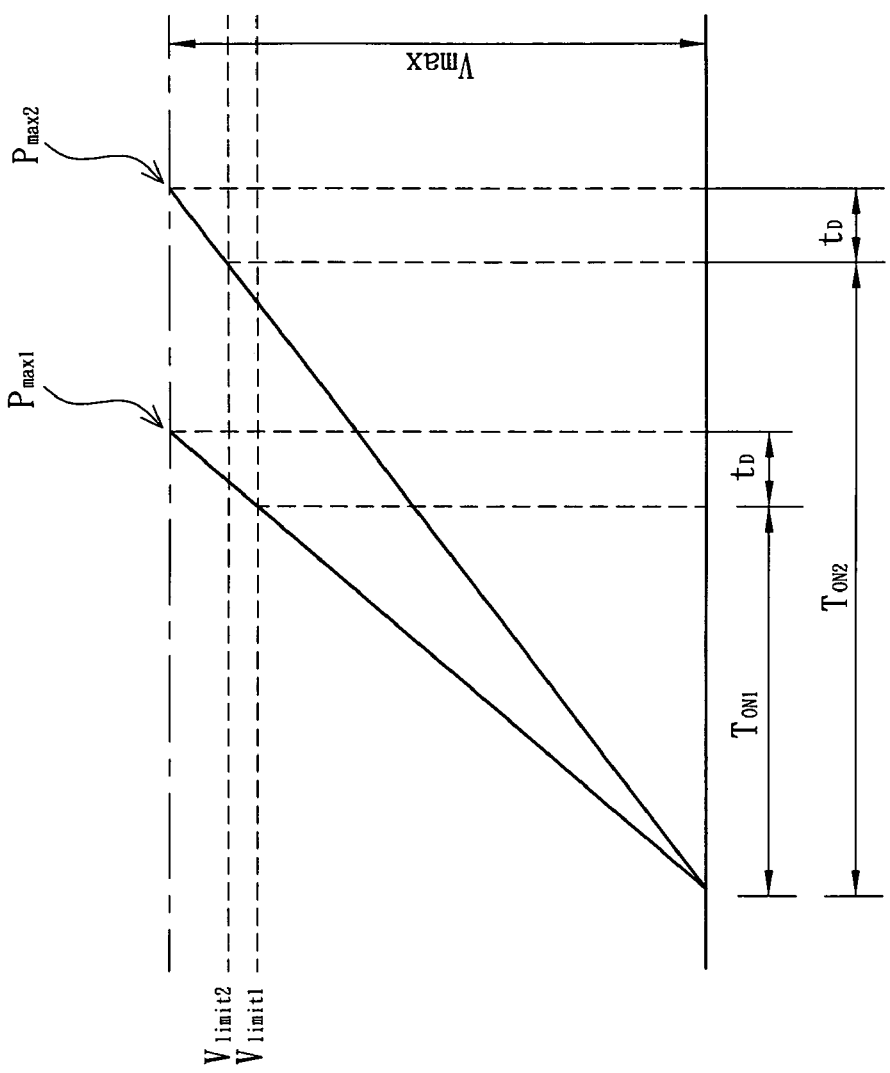
FIG. 5 shows the time diagram of the present invention if the variation of $V_{limit}$ is inversely proportion to the deviation of the input line voltage Vin, the output power limit will be identical.

It is to be understood that if the value of the resistor 131 is a constant, from equation (11), the variation of the maximum current-sense voltage Vmax is inversely proportion to the deviation of the input voltage Vin. By properly selection, the start-up resistor 210 can achieve an identical output power limit for the low line voltage and high line voltage such as 90Vac and 264Vac, as shown in FIG. 5.

Figure 4:
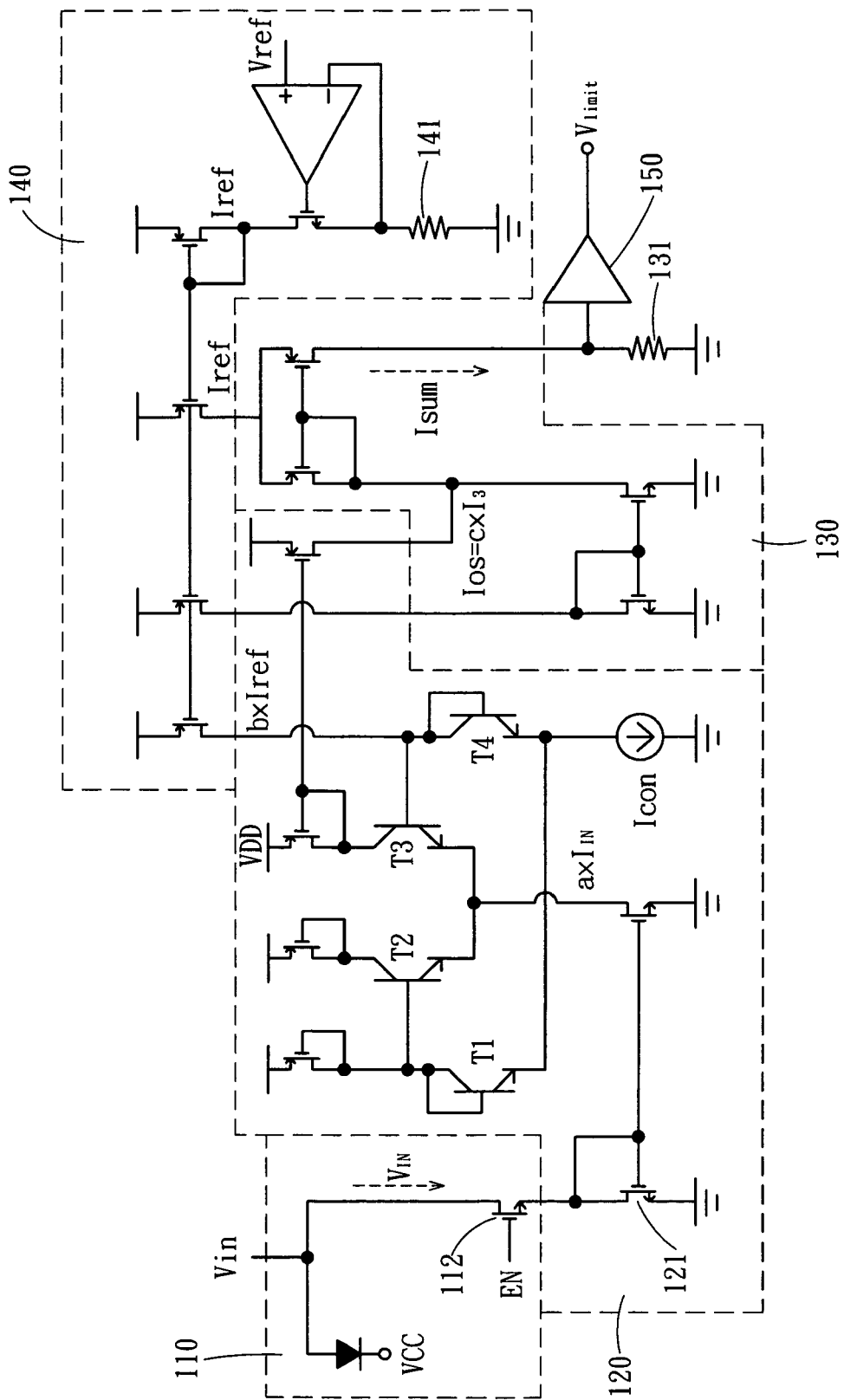
FIG. 4 is the detailed circuit inside the integrated circuit of the present invention.

However, it is difficult to design a precise resistor 131 inside the integrated circuit. Most integrated resistors have tolerance of ±20 to 30%. Our design depends on the resistors' matching to obtain the precision and performance, as shown in FIG. 4.

To set Iref in equation (11) to, $$Iref = \frac{V_{ref}}{R_{141}} \quad (12)$$

Where Vref is a reference voltage, $R_{141}$ is the resistance of resistor 131. We assume that the resistor 131 and the resistor 141 are well matched, then the first item in equation (11) is a constant. From the base-emitter loop and Kirchoff's voltage low, $$Vbe_{T1} - Vbe_{T2} = Vbe_{T4} - Vbe_{T3} \quad (13)$$

We assume that the transistors are well matched from equation (13), $$\frac{I_1 + I_4}{I_4} = \frac{I_2 + I_3}{I_3} \quad (14)$$

Where $I_n$ is the collector current of transistor Tn (n=1~4). From FIG. 4 and Kirchoff's current low, $$I_1 + I_4 = \text{Icon} \quad (15)$$

$$I_2 + I_3 = \alpha I_{IN} \quad (16)$$

Where Icon is a constant current. If the current gain $\beta_{T3}$ of the transistor T3 is large, the T3's base current can be neglected, thus $$I_4 = b \cdot \frac{V_{ref}}{R_{141}} \quad (17)$$

Then from equations (14)~(17) and rearranging, Ios can be calculated as:

$$Ios = c \cdot I_3 = c \cdot \frac{a \cdot I_{IN} \times b \cdot \frac{V_{ref}}{R_{31}}}{\text{Icon}} = K \cdot I_{IN} \quad (18)$$

$$K = a \cdot b \cdot c \cdot \frac{V_{ref}}{\text{Icon}} \cdot \frac{1}{R_{141}} \quad (19)$$

Where a, b, c are correspond current ratios. Equation (19) shows that if the resistor 131 and the resistor 141 are well matched, the coefficient of the second item in equation (11) is also a constant.

Although the invention has been explained in relation to its preferred embodiment, it is not used to restrain the invention. It is to be understood that many other possible modifications and variations can be made by those skilled in the art without departing from the spirit and scope of the invention as hereinafter claimed.

What is claimed is:

1. A PWM controller for controlling an output power limit of a power supply, comprising:
    a current switch unit, having a first terminal connected to a line input voltage of the power supply via a start-up resistor, a second terminal coupled to a power supply voltage, a third terminal connected to an under-voltage lockout unit, and a four terminal;
    a current multiplier, having a first terminal coupled to the four terminal of the current switch unit, and a second terminal;
    an adder, having a negative input terminal coupled to the second terminal of the current multiplier, a positive input terminal coupled to a reference current, and an output terminal;
    a resistor, having a first terminal coupled between the third terminal of the adder, and a second terminal coupled to a ground voltage;
    a buffer, having a input terminal coupled between the output terminal of the adder and the first terminal of the resistor, and an output terminal;
    a first comparator, having a positive input terminal coupled to the output terminal of the buffer, a negative input terminal, and an output terminal;
    a second comparator, having a positive input terminal coupled to the supply voltage, a negative terminal coupled to the negative terminal of the first comparator, and an output terminal;
    a NAND gate, having two input terminals coupled to the output terminals of the first and second comparators, and an output terminal; and
    a flip flop, coupled to the output terminal of the NAND gate; and an oscillator, coupled to the flip flop.

2. The PWM controller of claim 1, wherein the current switch unit comprising:
    a diode, having a anode connected to the input voltage, a cathode connected to the power supply voltage; and
    a switch transistor, having a gate terminal connected to the under-voltage lockout unit, a drain to the input voltage, and a source terminal connected to the adder.

* * * * *